United States Patent
Zafiroglu

(10) Patent No.: US 6,967,052 B2
(45) Date of Patent: Nov. 22, 2005

(54) STITCHED-BONDED YARN SURFACE STRUCTURE

(75) Inventor: Dimitri Zafiroglu, Wilmington, DE (US)

(73) Assignee: Invista North America S.a.r.l., Wilmington, DE (US)

( * ) Notice: Subject to any disclaimer, the term of this patent is extended or adjusted under 35 U.S.C. 154(b) by 67 days.

(21) Appl. No.: 10/271,361

(22) Filed: Oct. 15, 2002

(65) Prior Publication Data

US 2004/0071926 A1 Apr. 15, 2004

(51) Int. Cl.[7] .............. D05B 93/00; B32B 3/06; B32B 7/08
(52) U.S. Cl. .............. 428/102; 428/92; 428/95; 428/96; 112/402; 112/429; 112/430
(58) Field of Search ................... 112/402, 429, 112/430; 428/92, 94, 95, 96, 102, 318.8, 310.5

(56) References Cited

U.S. PATENT DOCUMENTS

| | | |
|---|---|---|
| 1,827,614 A | 10/1931 | Riviere |
| 2,261,096 A | 10/1941 | Reinhardt |
| 2,429,281 A | 10/1947 | Solins |
| 2,448,928 A | 9/1948 | Stahl |
| 2,629,678 A | 2/1953 | Thompson et al. |
| 2,688,578 A | 9/1954 | Teague |
| 2,892,331 A | 6/1959 | Kelly |
| 3,002,868 A | 10/1961 | Boivin |
| 3,009,235 A | 11/1961 | De Mestral |
| 3,070,983 A | 1/1963 | Hubbard et al. |
| 3,109,302 A | 11/1963 | Vitek |
| 3,168,883 A | 2/1965 | Ploch et al. |
| 3,230,917 A | 1/1966 | Wignall et al. |
| 3,253,426 A | 5/1966 | Mauersberger |
| 3,360,422 A | 12/1967 | Desch |
| 3,401,657 A | 9/1968 | Watkins |

(Continued)

FOREIGN PATENT DOCUMENTS

| | | |
|---|---|---|
| BE | 762634 | 2/1971 |
| DE | 2935387 | 3/1981 |

(Continued)

OTHER PUBLICATIONS

Horrocks, A.R. and Anand, S.C. Handbook of Technical Textiles. Woodhead Publishing, Cambridge, England. 2000. p. 149.*

(Continued)

*Primary Examiner*—Cheryl A. Juska
*Assistant Examiner*—Jenna-Leigh Befumo

(57) ABSTRACT

A stitched yarn surface structure includes a backing having decorative upper surface and a thickness dimension T of at least two (2) millimeters. The backing exhibits a predetermined compressive resistance $R_b$. Plural rows of face yarn segments cover at least a portion of the decorative upper surface of the backing, with adjacent face yarn segments being spaced apart by a predetermined minimum spacing dimension S. The yarns forming the face yarn segments have a predetermined compressive resistance $R_y$. The compressive resistance $R_b$, the compressive resistance $R_y$, and the spacing S are selected such that a load of up to one hundred (100) pounds per square inch (psi) imposed on the stitched yarn surface structure by a loading member is able to be borne by the stitched yarn surface structure without allowing contact between the member and the decorative upper surface of the backing.

4 Claims, 3 Drawing Sheets

U.S. PATENT DOCUMENTS

| | | |
|---|---|---|
| 3,458,337 A | 7/1969 | Rugg |
| 3,602,011 A | 8/1971 | Barton et al. |
| 3,620,890 A | 11/1971 | Kemmler |
| 3,677,206 A | 7/1972 | MacIsaac, Jr. et al. |
| 3,722,442 A | 3/1973 | MacIsaac, Jr. et al. |
| 3,727,433 A | 4/1973 | Hamano |
| 3,837,943 A | 9/1974 | Ploch et al. |
| 3,871,948 A | 3/1975 | Norris |
| 4,013,407 A | 3/1977 | Ray, Jr. |
| 4,026,129 A | 5/1977 | Sternlieb |
| 4,103,630 A | 8/1978 | Wignall |
| 4,108,957 A | 8/1978 | Michel |
| 4,119,397 A | 10/1978 | Synder |
| 4,138,521 A | 2/1979 | Brown |
| 4,159,360 A | 6/1979 | Kim |
| 4,192,159 A | 3/1980 | Kohl |
| 4,244,312 A | 1/1981 | Bialy |
| 4,347,718 A | 9/1982 | Haverland et al. |
| 4,406,309 A | 9/1983 | Czelusniak, Jr. |
| 4,502,902 A | 3/1985 | Zurcher et al. |
| 4,619,853 A | 10/1986 | Blyth et al. |
| 4,624,878 A | 11/1986 | Evans et al. |
| 4,762,744 A | 8/1988 | Woiceshyn et al. |
| 4,818,316 A | 4/1989 | Weinle et al. |
| 4,863,777 A | 9/1989 | Callaway et al. |
| 4,871,604 A | 10/1989 | Hackler |
| 4,998,421 A | 3/1991 | Zafiroglu |
| 5,038,584 A | 8/1991 | Wildeman |
| 5,102,482 A | 4/1992 | Rogers, Jr. |
| 5,348,785 A | 9/1994 | Vinod |
| 5,445,860 A | 8/1995 | Bova |
| 5,447,590 A | 9/1995 | Gilpatrick |
| 5,470,629 A | 11/1995 | Mokhtar et al. |
| 5,472,762 A | 12/1995 | Edwards et al. |
| 5,498,459 A | 3/1996 | Mokhtar et al. |
| 5,510,142 A | 4/1996 | Groshens |
| 5,532,035 A | 7/1996 | Corbin et al. |
| 5,575,228 A | 11/1996 | Padgett, III et al. |
| 5,605,107 A | 2/1997 | Padgett, III et al. |
| 5,618,624 A | 4/1997 | Dinger et al. |
| 5,626,912 A | 5/1997 | Hendrix et al. |
| 5,699,593 A | 12/1997 | Jackson |
| 5,747,133 A | 5/1998 | Vinod et al. |
| 5,866,229 A | 2/1999 | Gartner et al. |
| 5,902,757 A | 5/1999 | Stern et al. |
| 5,906,877 A | 5/1999 | Popper et al. |
| 5,965,232 A | 10/1999 | Vinod |
| 6,269,759 B1 | 8/2001 | Zafiroglu et al. |
| 6,338,885 B1 | 1/2002 | Prevost |
| 6,521,554 B1 | 2/2003 | Wildeman |

FOREIGN PATENT DOCUMENTS

| | | |
|---|---|---|
| DE | 3119636 | 6/1982 |
| DE | 244582 | 4/1987 |
| DE | 4228563 | 3/1994 |
| DE | 94 11 993.7 | 7/1994 |
| DE | 4335109 | 4/1995 |
| DE | 19506845 | 8/1996 |
| DE | 4417692 | 4/1997 |
| EP | 0529575 | 3/1993 |
| EP | 0568916 | 11/1993 |
| EP | 0347206 | 6/1998 |
| FR | 2160631 | 6/1973 |
| GB | 1074741 | 7/1967 |
| GB | 1128801 | 10/1968 |
| GB | 1194027 | 6/1970 |
| GB | 1 427 191 | 5/1976 |
| GB | 2140047 | 11/1984 |
| GB | 2 185 213 A | 7/1987 |
| JP | 37-12031 | 8/1962 |
| JP | 43-20277 | 8/1968 |
| JP | 63-203854 | 8/1988 |
| JP | 247352 | 2/1990 |
| JP | 6128862 | 10/1992 |
| JP | 5-92538 | 4/1993 |
| JP | 5-266372 | 10/1993 |
| JP | 291447 | 11/1996 |
| WO | WO 9803711 | 1/1998 |
| WO | WO 0052246 | 9/2000 |

OTHER PUBLICATIONS

Totora, Phyliss G. Understanding Textiles: Fourth Edition. Macmillian Publishing Company, New York. 1992. pp. 375–378.*

Malimo®, Sewing–Knitting Machines, Six Parts, discussing Technical Possibilities and Technology.

Mayer, Karl. Tricot Machine pamphlet. Jan. 15, 1997.

Mohawk Commercial Carpet Pamphlet, dated Nov. 1994.

Malimo®, Sewing–Knitting Machines, Six machine types for the manufacture of the most various textile fabric constructions made of fibres and threads. 1974.

Teppich–Wirkmaschine Carpet Knitting Machine, Model 14 125, pamphlet.

Levinstein, Jerry. The Complete Carpet Manual, 1992. pp. 12–15.

www.tias.com/stores/acottage/rugs–1.html, Antique Cottage, 2000.

* cited by examiner

STITCHED-BONDED YARN SURFACE STRUCTURE

BACKGROUND OF THE INVENTION

1. Field of the Invention

The present invention relates to a floor covering, and in particular, to a floor covering in the form of a stitched-bonded yarn surface structure itself formed of materials selected to prevent contact between a force-imposing member, such as a shoe, and a decorative upper surface of a backing.

2. Description of the Prior Art

Resilient floor coverings formed as laminates of woven, non-woven or knit fabrics and a resilient, dimensionally stable backing offer certain advantages. The flat, easy-to-clean surface does not harbor bacteria and the reduced face yarn consumption reduces cost. These floor coverings also offer special decorative effects, one of which is partial coverage of the primary backing by the backlaps of tufted face yarns. Representative of such resilient laminate floor coverings include the floor covering described in U.S. Pat. No. 5,965,236 (Vinod), assigned to the assignee of the present invention, or to the floor covering manufactured and sold by Interface Corporation under the trademark Solenium® or the floor covering manufactured and sold by Lees Carpets under the trademark Metafloor®. However, such prior art layered structures have the potential for delamination and edge fraying, unless the structure is heavily reinforced with adhesives, especially at the edges.

The floor covering described in International Publication WO 01/83868 (Zafiroglu et al.) (RD-7950), also assigned to the assignee of the present invention, removes the danger of delamination. This floor covering is a unitary stitch-bonded yarn surface structure utilizing relatively thick and resilient backings. In this yarn surface structure the entire surface presented to the user is fully covered by the backlaps of the face yarns. This has the effect of limiting the cost reduction achieved by the partial coverage of the face. The aesthetics offered by partially covered face structures is also not available.

In view of the foregoing a unitary, mechanically interlocked stitch-bonded yarn surface structure of the type disclosed in the last-mentioned International Publication that reduces or eliminates the use of adhesives to prevent delamination or edge fraying is believed desirable. However, it is believed even more advantageous if such a stitch-bonded yarn surface structure offered the aesthetic advantages afforded by partial face coverage of a decorative backing surface.

SUMMARY OF THE INVENTION

The present invention is directed to a stitched yarn surface structure that includes a backing having an upper and a lower surface and a thickness dimension T of at least two (2) millimeters. The upper surface of the backing is decorative. The backing exhibits a predetermined compressive resistance $R_b$. Plural rows of face yarn segments cover at least a portion of the decorative upper surface of the backing, with adjacent face yarn segments being spaced apart by a predetermined minimum spacing dimension S. Various properties of the yarn forming the face yarn segments, including the yarn diameter D and the yarn denier d, are selected such that a predetermined compressive resistance $R_y$ is imparted to the yarns forming the face yarn segments.

In accordance with the present invention the compressive resistance $R_b$, the compressive resistance $R_y$, and the spacing S are selected such that a load of up to one hundred pounds per square inch (100 psi), and more preferably, up to two hundred pounds per square inch (200 psi), imposed on the stitched yarn surface structure by a loading member is able to be borne by the stitched yarn surface structure without allowing contact between the member and the decorative upper surface of the backing.

The backing may be implemented in a variety of ways. The backing may take the form of an integral cushion member having a uniform density throughout its thickness. The backing may be modified such that a region adjacent the upper surface thereof may be more dense than the remainder of the member, thereby to form a relatively rigid crust near the upper surface. Alternatively, the backing may be formed as a laminate of a uniform density cushion member with a separate rigid sheath laid thereover, in which case the upper surface of the sheath serves as the upper surface of the backing.

By whatever alternative implemented the backing may further include a decorative layer (such as a decorative fabric or film) laid over the upper surface of the integral cushion member or the rigid sheath (if used). In this event the decorative upper surface of the backing is provided by the fabric layer.

The face yarn segments may be defined by stitch-bonded underlaps that are stitched into the backing. Longitudinally or transversely (weft) extending strands of a binder material may be included, and are held to the backing by an additional stitching thread. Alternatively, the stitch-bonded underlaps that define the face yarn segments may be laid onto the backing and held by a separate stitching thread. The longitudinal or transverse strands of a binder (if provided) are held to the backing by the stitching thread.

BRIEF DESCRIPTION OF THE DRAWINGS

The invention will be more fully understood from the following detailed description, taken in connection with the accompanying drawings, which form a part of this application and in which:

FIG. 2A is a side elevational view (comprising six panels I–VI) showing a stitched yarn surface structure in the uncompressed state taken along view lines 2—2 of FIG. 1 wherein the face yarn segments of the stitched yarn surface structure are laid-in over the backing, while

DESCRIPTION OF PREFERRED EMBODIMENT

Figure 1:
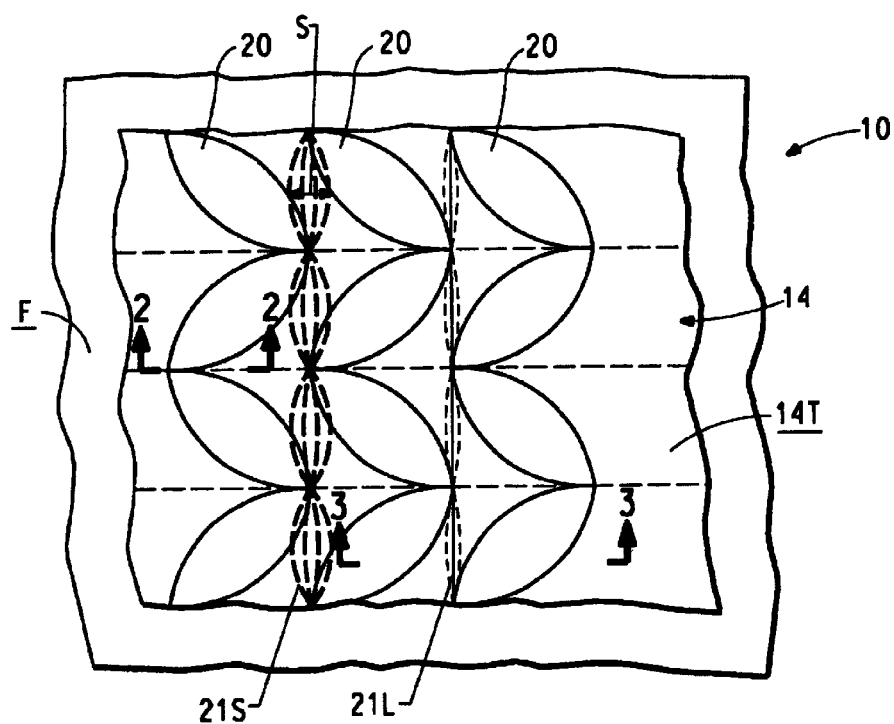
FIG. 1 is a diagrammatic plan view of a stitched yarn surface structure in accordance with the present invention.

Throughout the following detailed description similar reference numerals refer to similar elements in all figures of the drawings.

Figure 2A:
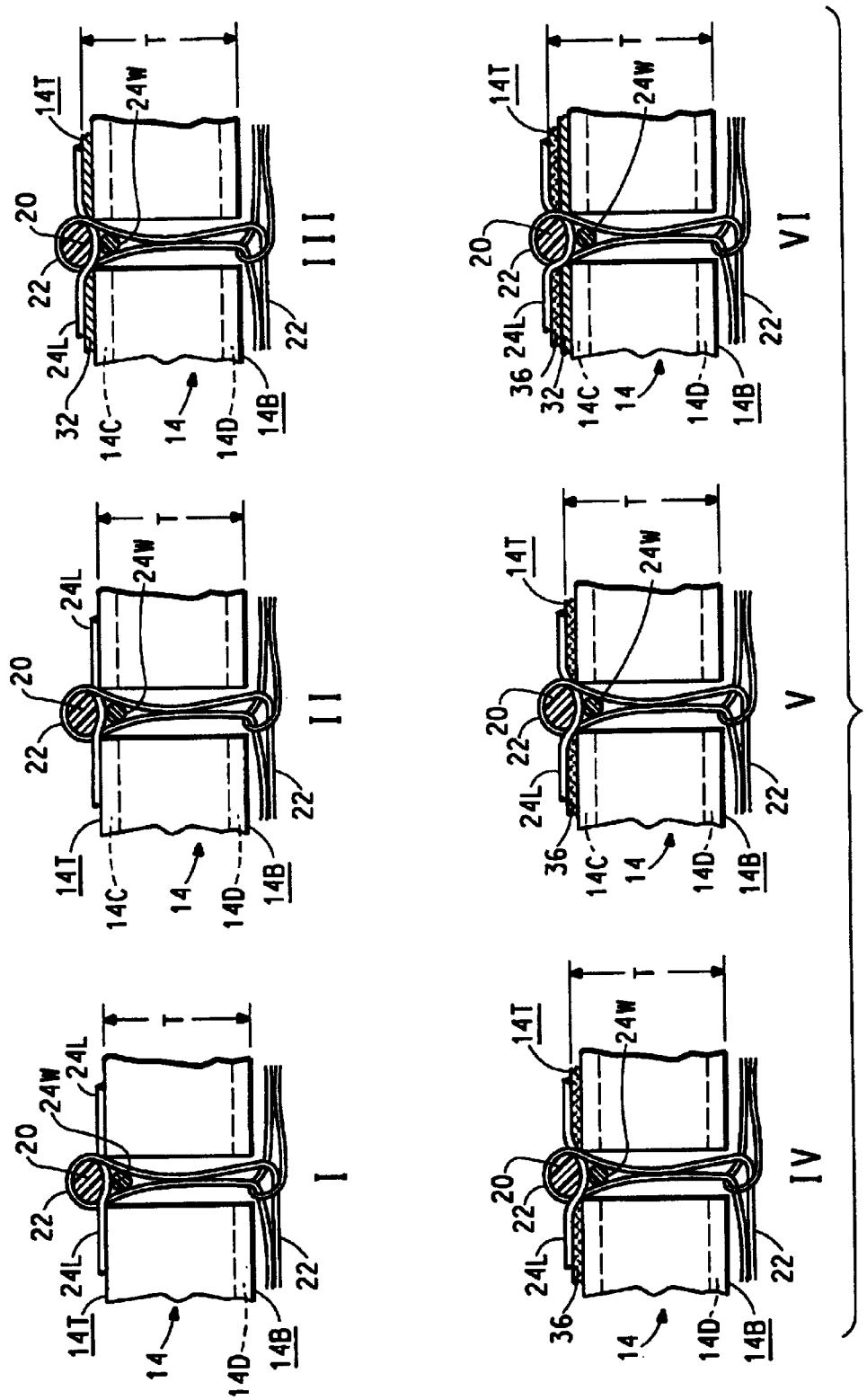
Figure 2B:
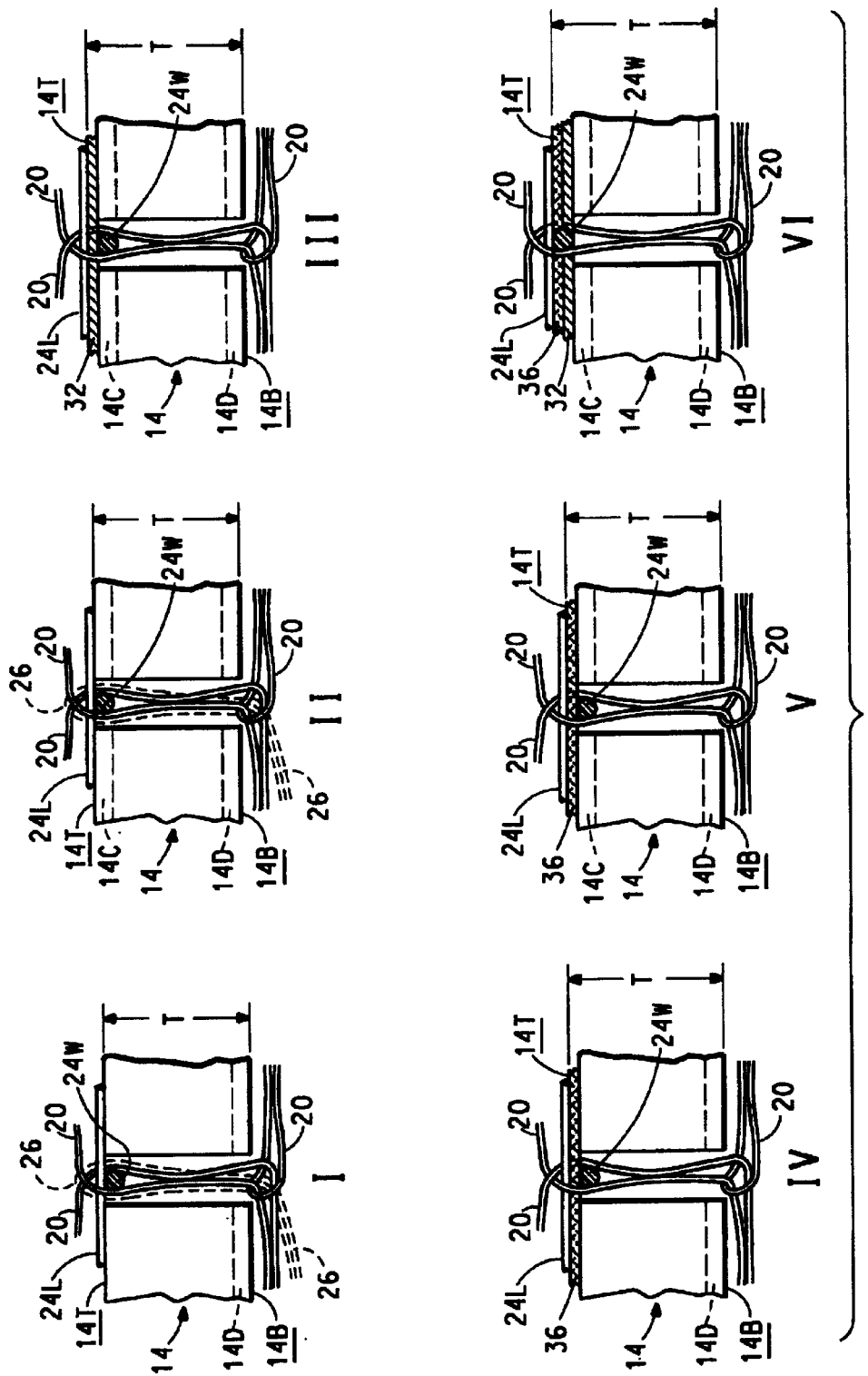
FIG. 2B is a view (again comprising six panels I–VI) generally similar to FIG. 2A but in which the face yarn segments are stitched into the backing, the various forms of backing being illustrated in different panels of each of FIGS. 2A and 2B.

Referring to the drawings FIG. 1 is a plan view of a stitched yarn surface structure generally indicated by the reference character 10 in accordance with the present invention. FIGS. 2A and 2B are side elevational views taken along view lines 2—2 illustrating alternate embodiments of the stitched yarn surface structure 10 of the present invention in the uncompressed state.

The stitched yarn surface structure 10 includes a backing generally indicated by the reference numeral 14. As will be developed the backing 14 may be implemented in a variety of ways. A plurality of rows of face yarn segments 20 extends longitudinally (i.e., along the machine direction) over the top surface 14T of the backing 14. The yarn segments may be either stitched into the backing, as suggested diagrammatically in FIG. 1 by the reference character 21S, or laid into the backing 14, as suggested by the reference character 21L. Adjacent rows of face yarn segments 20 are spaced apart by a predetermined minimum spacing dimension S. The minimum spacing dimension S is the shortest distance measured in the plane of the yarn surface structure lying between adjacent face yarn segments 20

As perhaps best seen by reference to FIGS. 2A, 2B, the backing 14 has a first, top, surface 14T and a second, bottom, surface 14B. In use the bottom surface 14B of the backing 14 lies against a floor surface F (FIG. 1) while the top surface 14T is presented toward a user. The top surface 14T of the backing 14 is decorative. By "decorative" it is meant that the top surface 14T of the backing is aesthetically attractive, either due to color, texture, design, sheen or any combination of these or other factors. The decorative ornamentation of the top surface 14T may be effected in any of a variety of ways, including printing, embossing, or the use of colored yarns. As will also be developed, the decorative effect may be imparted by the use of a layer of a printed or multicolored woven, knit, stitched or non-woven fabrics, mesh scrims, and/or multicolored films. The advantage afforded by the yarn surface structure of this invention is that such decorative ornamentation does not have to be abrasion resistant in itself, since, even as it is partially exposed, it is protected by the open network of the face yarns.

The backing 14 is penetrable by a stitching needle and exhibits a predetermined overall compressive resistance $R_b$. In the uncompressed state the backing 14 has a thickness dimension T that is at least two millimeters (2 mm). The thickness dimension T is measured between bottom surface 14B and the top surface 14T of the backing (including any decorative layer provided thereon, as discussed herein).

The yarns forming the face yarn segments 20 may be made from any natural or synthetic fiber and may be in the continuous filament or spun-staple form. Most commonly, the yarn material is nylon, polyester or polypropylene. Bi-component yarns used in carpets and upholstery may also be utilized.

The yarns forming the face yarn segments 20 have (in the uncompressed state) a predetermined diameter D (FIG. 3) and a predetermined denier d. These parameters, along with the compressive resistance of the material used to make the yarn and the yarn geometry, cooperate to impart a predetermined compressive resistance $R_y$ to the yarns forming the face yarn segments 20.

The face yarn segments 20 cover at least a portion of the upper surface of the backing 14T. Owing to the spacing S between adjacent face yarn segments 20 those areas of the decorative upper surface 14T that lie between the face yarn segments 20 are exposed to view.

The face yarn segments 20 may be either stitched-in or laid-in over the top surface of the backing 14T using conventional stitch-bonding apparatus. The stitch-bonding apparatus manufactured by Karl Mayer Textilmaschinenfabrik GmbH, Obertshausen, Germany and sold as model RS-3 is suitable for use in forming the stitched yarn surface structure 10 in accordance with the present invention.

The laid-in version of the stitched yarn surface structure is shown in FIG. 2A. In this arrangement the face yarn segments 20 are defined by conventional yarn underlaps held to the top surface 14T of the backing 14 by the overstitches of a stitching thread 22. Optionally, longitudinally extending strands 24L of a binder material may be placed over the top surface 14T of the backing. The longitudinally extending binder strands 24L are held to the backing 14 by the stitching thread 22 which is laid-into the structure in a conventional manner. Alternatively or additionally, transversely extending strands 24W of a binder material may be provided. These strands 24W are also held to the backing by the action of the stitching thread 22.

The stitched-in version of the yarn surface structure is shown in FIG. 2B. In this case the face yarn segments 20 are defined by conventional yarn underlaps held to the top surface 14T of the backing 14 by the interlocking of the overlaps on the opposite surface 14B. Optional longitudinal binder strands 24L and/or transverse strands 24W may be provided over the backing. The strands 24L and/or 24W (if provided) are held to the backing by a separate stitching thread 26 forming a chain stitch. The stitching thread 26 is illustrated only in panels I and II of FIG. 2B for clarity.

As the term is used herein "binder" refers to a thermoplastic polymeric adhesive material that melts at a lower temperature than the rest of the materials in the structure. The polymer used to form the binder material must melt at a temperature about ten to fifty degrees Centigrade (10–50° C.) less than the lowest melting temperature of the other materials used in the structure 10. Suitable for use as the binder material are yarns or slit film strands of polypropylene, polyethyelene, polyvinyl acetate, or low-melting copolymers of polyesters or polyamides.

As noted previously, the backing 14 may be implemented in a variety of forms. The various forms of backing are illustrated in different panels of each of FIGS. 2A and 2B.

In its most basic form the backing 14 is implemented using an integral cushion member having a substantially uniform density throughout its thickness. This implementation is illustrated at panel I of both FIGS. 2A and 2B. Suitable for use as the cushion member are various felts, needle punched batts or elastic foams.

An alternative implementation of the backing is illustrated at panel II of FIGS. 2A and 2B. In this instance a region of the cushion member adjacent to the upper surface 14T of the backing 14 is more rigid than the material forming the remainder of the cushion, thereby defining a crust 14C. The crust provides a harder layer that is not easily indented by a pressure force applied to the face yarns segments and yet can transfer a pressure force into the softer layers of the cushion below the crust 14C, thus maintaining a "cushiony" feel to the backing 14 as a whole.

Alternatively or additionally, the backing may be implemented as a laminated structure as illustrated at panel III of FIGS. 2A and 2B. In this implementation a rigid sheath member 32 is provided on the upper surface of the cushion member. The sheath may be attached or simply laid over the cushion member. The attachment of the sheath 32 to the cushion member may be implemented either thermally, adhesively, or mechanically (as by needle punching).

The sheath 32 is formed from a material that resists elongation along its own plane. Suitable for use as the sheath 32 is a stiff polyester film such as that sold by E.I. Du Pont de Nemours and Company under the trademark as Mylar® or a woven, slit film primary backing material. It is to be noted that when the sheath 32 is used the thickness dimension T of the backing 14 includes the dimension of the sheath 32.

In the implementations illustrated in panels I through III of FIGS. 2A and 2B the upper surface of the cushion serves to define the top surface 14T of the backing 14 that is visible through the spaces defined between adjacent face yarn segments 20.

If desired the backing 14 (however implemented) may be overlaid by a decorative layer 36. If used the layer 36 defines the decorative top surface 14T of the backing 14 and is included within the thickness dimension T of the backing. The decorative layer 36 is attached to the upper surface of the cushion by adhesives or it may be loosely laid over the surface 14T of the backing 14 and held by the action of the face yarns 20. The decorative layer 36 can be implemented using any printed or multicolored woven, knit, stitched or non-woven fabrics, mesh scrims, and/or multicolored films woven, knit, non-woven or film material.

All of the various implementations of the backing 14 shown and described in connection with any of panels I through VI of FIGS. 2A and 2B may be further modified by optionally disposing a second region 14D of increased rigidity adjacent to the bottom surface of the cushion. The second region 14D defines a skin that lies adjacent to the bottom surface 14B of the backing 14.

In accordance with the present invention the compressive resistance $R_b$ of the backing 14, the compressive resistance $R_y$ of the yarns forming the face yarn segments, and the spacing S between adjacent segments are selected such that a load of at least one hundred pounds per square inch (100 psi), and more preferably, at least one hundred pounds per square inch (100 psi), imposed on the stitched yarn surface structure by a loading member M is able to be borne by the stitched yarn surface structure without allowing contact between the member and the top surface 14T of the backing 14. Thus, the decorative upper surface of the backing 14 is protected from abrasion and wear from foot traffic.

Figure 3:
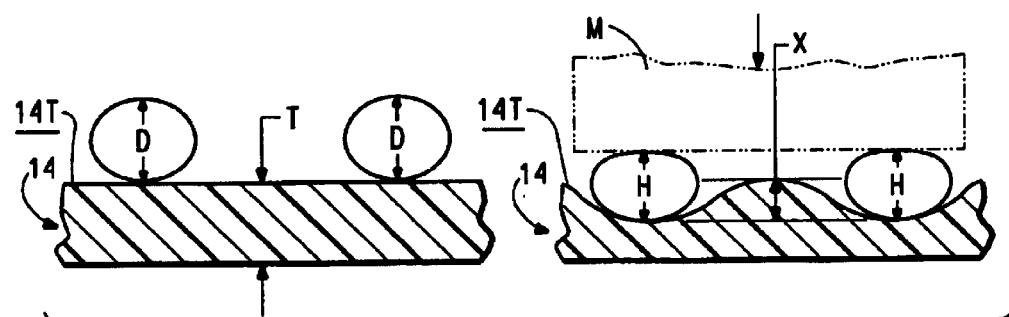
FIG. 3 is a side elevational view taken along view lines 3—3 of FIG. 1 illustrating the stitched yarn surface structure of the present invention in the uncompressed and compressed states.

The basic guidelines by which the compressive resistance $R_b$ of the backing 14, the compressive resistance $R_y$ of the yarns forming the face yarn segments 20, and the spacing S between adjacent segments 20 are selected may be understood by examining the response of the yarn surface structure 10 to the imposition of a load as illustrated in FIG. 3. The left hand portion of FIG. 3 illustrates the stitched yarn surface structure 10 in an uncompressed state, while the right hand portion of FIG. 3 illustrates the stitched yarn surface structure 10 under loading from a loading member M, such as a shoe. In the uncompressed situation the yarns have a diameter D. In the compressed state the yarns have a compressed diameter H and the deflection of the backing from its uncompressed level is indicated as X.

In an extreme boundary situation either the backing and/or the yarn is formed of an incompressible material. For example, if an incompressible material were used for the yarn or the backing, contact between the loading member M and the decorative upper surface of the backing is precluded.

However, in actuality, neither a yarn nor a backing is incompressible. Thus, to protect the decorative upper surface under the compressive load the materials of the yarns and/or the backing must be selected such that the compressed height H of the yarns is larger than the depth X of the indentation formed in the backing.

The compressed height H of the yarn is determined, in part, by the compressive resistance $R_y$ of the yarn. The compressive resistance $R_y$ of the yarn is dependent upon one or more of the following: the denier of the yarn; the hardness of the polymer from which the yarn is made (the "compressive modulus" of the yarn); and the twist tightness of the yarn.

The depth X of the indentation is determined, in part, by the compressive resistance $R_b$ of the backing 14. This parameter is itself determined by the hardness of the material from which the backing is made (the "compressive modulus" of the backing); the stretch stiffness of the material from which the backing is made (the "stretch modulus" of the backing); and the structure of the backing (i.e., whether a sheath 32 and/or a crust 14C is present).

The spacing S also contributes to the compressed height H and to the indentation depth X. The compressive height H of the yarn decreases and the depth of the indentation increases with increasing spacing between yarns.

The guidelines for selection of the compressive resistance $R_b$ of the backing 14, the compressive resistance $R_y$ of the yarns, and the spacing S may be further understood by consideration of some exemplary combinations of materials.

Using needlepunched batts with a density over 0.25 gm/cc, multifilament bulk continuous filament (BCF) nylon yarns having a denier of five to twenty denier per filament (5–20 dpf), highly twisted to two thousand to three thousand denier (2000–3000 d) with a spacing of less than six millimeters (6 mm) can withstand up to one hundred pounds per square inch (100 psi), and more preferably, up to two hundred pounds per square inch (200 psi), without collapsing sufficiently to allow contact by the loading member M with the decorative upper surface of the backing 14.

Using harder surfaces, such as woven polyester slit film layer used a tufted primary carpet backing on top of a softer batt, with the same yarn system, also provides a structure that can withstand up to one hundred pounds per square inch (100 psi), and more preferably, up to two hundred pounds per square inch (200 psi), without collapsing sufficiently to allow contact by the loading member M with the decorative upper surface of the backing 14.

Those skilled in the art, having the benefit of the teachings of the present invention as hereinabove set forth, may impart numerous modifications thereto. Such modifications are to be construed as lying within the contemplation of the present invention, as defined by the appended claims.

What is claimed is:

1. A stitched yarn surface structure comprising:
   a backing having an upper and a lower surface and a thickness dimension T of at least two (2) millimeters, the backing being penetrable by a stitching needle and simultaneously exhibiting a predetermined compressive resistance $R_b$;
   the upper surface of the backing being decorative,
   a plurality of rows of face yarn segments covering at least portion of the decorative upper surface of the backing, wherein the face yarn segments are defined by a plurality of stitch bonded underlaps stitched into the backing, and further comprising a longitudinally extending strand of a binder material held to the backing by an additional stitching thread,
   adjacent face yarn segments being spaced apart by a predetermined minimum spacing dimension S,
   the yarns forming the face yarn segments each having a predetermined compressive resistance $R_y$;
   wherein the compressive resistance $R_b$, the compressive resistance $R_y$, and the spacing S are selected such that a load of up to one hundred pounds per square inch (100 psi) imposed on the stitched yarn surface structure by a loading member is able to be borne by the stitched yarn surface structure without allowing contact between the member and the decorative upper surface of the backing.

2. A stitched yarn surface structure comprising:

a backing having an upper and a lower surface and a thickness dimension T of at least two (2) millimeters, the backing being penetrable by a stitching needle and simultaneously exhibiting a predetermined compressive resistance $R_b$;

the upper surface of the backing being decorative, a plurality of rows of face yarn segments covering at least portion of the decorative upper surface of the backing, wherein the face yarn segments are defined by a plurality of stitch bonded underlaps stitched into the backing, and further comprising a transversely extending strand of a binder material held to the backing by an additional stitching tread, adjacent face yarn segments being paced apart by a predetermined minimum spacing dimension S, the yarns forming the face yarn segments each having a predetermined compressive resistance $R_y$;

wherein the compressive resistance $R_b$, the compressive resistance $R_y$, and the spacing S are selected such that a load of up to one hundred pounds per square inch (100 psi) imposed on the stitched yarn surface structure by a loading member is able to be borne by the stitched yarn surface without allowing contact between the member and the decorative upper surface of the backing.

3. A stitched yam surface structure comprising:

a backing having an upper and a lower surface and a thickness dimension T of at least two (2) millimeters, the backing being penetrable by a stitching needle and simultaneously exhibiting a predetermined compressive resistance $R_b$;

the upper surface of the backing being decorative, a plurality of rows of face yarn segments covering at least portion of the decorative upper surface of the backing, wherein the face yarn segments are defined by a plurality of stitch bonded underlaps held to the backing by an additional stitching thread, and further comprising a longitudinally extending strand of a binder material held to the backing by an additional stitching thread, adjacent face yarn segments being spaced apart by a predetermined minimum spacing dimension S, the yarns forming the face yarn segments each having a predetermined compressive resistance $R_y$;

wherein the compressive resistance $R_b$, the compressive resistance $R_y$, and the spacing S are selected such that a load of up to one hundred pounds per square Inch (100 psi) imposed on the stitched yarn surface structure by a loading member is able to be borne by the stitched yarn surface without allowing contact between the member and the decorative upper surface of the backing.

4. A stitched yarn surface structure comprising:

a backing having an upper and a lower surface and a thickness dimension T of at least two (2) millimeters, the backing being penetrable by a stitching needle and simultaneously exhibiting a predetermined compressive resistance $R_b$;

the upper surface of the backing being decorative, a plurality of rows of face yarn segments covering at least portion of the decorative upper surface of the backing, wherein the face yarn segments are defined by a plurality of stitch bonded underlaps held to the backing by an additional stitching thread, and further comprising a transversely extending strand of a binder material held to the backing by an additional stitching tread, adjacent face yarn segments being spaced apart by a predetermined minimum spacing dimension S, the yarns forming the face yarn segments each having a predetermined compressive resistance $R_y$;

wherein the compressive resistance $R_b$, the compressive resistance $R_y$, and the spacing S are selected such that a load of up to one hundred pounds per square inch (100 psi) imposed on the stitched yarn surface structure by a loading member is able to be borne by die stitched yarn surface without allowing contact between the member and the decorative upper surface of the backing.

* * * * *